United States Patent
Wu et al.

(10) Patent No.: US 9,863,608 B2
(45) Date of Patent: Jan. 9, 2018

(54) LIGHT EMITTING DEVICE, LIGHT EMITTING DEVICE ASSEMBLY AND RELEVANT PROJECTION SYSTEM

(71) Applicant: APPOTRONICS CORPORATION LIMITED, Shenzhen (CN)

(72) Inventors: Xiliang Wu, Shenzhen (CN); Fei Hu, Shenzhen (CN)

(73) Assignee: APPOTRONICS CORPORATION LIMITED, Shenzhen (CN)

( * ) Notice: Subject to any disclaimer, the term of this patent is extended or adjusted under 35 U.S.C. 154(b) by 454 days.

(21) Appl. No.: 14/370,739

(22) PCT Filed: Jan. 7, 2013

(86) PCT No.: PCT/CN2013/070136
§ 371 (c)(1),
(2) Date: Jul. 3, 2014

(87) PCT Pub. No.: WO2013/123834
PCT Pub. Date: Aug. 29, 2013

(65) Prior Publication Data
US 2015/0233550 A1    Aug. 20, 2015

(30) Foreign Application Priority Data

Feb. 26, 2012 (CN) .......................... 2012 1 0044533

(51) Int. Cl.
*G03B 21/14* (2006.01)
*F21V 14/08* (2006.01)
(Continued)

(52) U.S. Cl.
CPC .............. *F21V 14/08* (2013.01); *F21V 13/08* (2013.01); *G02B 26/008* (2013.01); *G03B 21/204* (2013.01)

(58) Field of Classification Search
CPC ....... F21V 14/08; F21V 13/08; G02B 26/008; G03B 21/204
(Continued)

(56) References Cited

U.S. PATENT DOCUMENTS 6,574,046 B1   6/2003   Shioya
6,795,249 B2   9/2004   Shioya
(Continued)

FOREIGN PATENT DOCUMENTS

CN    102346362    2/2012
CN    102854729    1/2013
(Continued)

OTHER PUBLICATIONS

International Search Report in the parent PCT application No. PCT/CN2013/070136, dated Apr. 4, 2013.
(Continued)

*Primary Examiner* — Bryon T Gyllstrom
(74) *Attorney, Agent, or Firm* — Chen Yoshimura LLP

(57) ABSTRACT

A light emitting device assembly comprises a wavelength conversion device, a drive device and an adapter. The wavelength conversion device comprises a wavelength conversion layer having at least one wavelength conversion region for receiving an exciting light and converting it into an excited light. The drive device comprises a drive surface used to drive the wavelength conversion device to move, so that a light spot of the exciting light acts on the wavelength conversion device along a preset path. The adapter coaxially connects the drive device and the wavelength conversion device and enables a light ray to arrive at the wavelength conversion device on a side facing the drive device and inside an axial-direction projection of the drive surface on the surface of the wavelength conversion device. The drive surface and the wavelength conversion layer at least par-
(Continued)

tially overlap along the projection surface of the axial projection.

16 Claims, 5 Drawing Sheets

(51) Int. Cl.
*G02B 26/00* (2006.01)
*F21V 13/08* (2006.01)
*G03B 21/20* (2006.01)

(58) Field of Classification Search
USPC .......................................................... 362/84
See application file for complete search history.

(56) References Cited

U.S. PATENT DOCUMENTS

| | | | |
|---|---|---|---|
| 8,342,697 B2 | 1/2013 | Iwanaga | |
| 8,354,790 B2 | 1/2013 | Iwanaga | |
| 2003/0117590 A1 | 6/2003 | Hunziker et al. | |
| 2003/0184870 A1 | 10/2003 | Shioya | |
| 2006/0245093 A1* | 11/2006 | Kao | G02B 26/008 359/892 |
| 2008/0049346 A1* | 2/2008 | Cusick | G02B 26/008 359/891 |
| 2008/0180823 A1* | 7/2008 | Tso | G02B 7/008 359/892 |
| 2008/0192372 A1* | 8/2008 | Lin | G02B 26/008 359/892 |
| 2008/0225240 A1* | 9/2008 | Chang | G03B 33/08 353/84 |
| 2009/0033887 A1* | 2/2009 | Lin | G03B 21/008 353/99 |
| 2009/0034106 A1* | 2/2009 | Ho | G02B 26/008 359/892 |
| 2009/0122273 A1* | 5/2009 | Menard | G02B 26/008 353/84 |
| 2009/0284148 A1 | 11/2009 | Iwanaga | |
| 2011/0063581 A1 | 3/2011 | Iwanaga | |
| 2011/0116253 A1* | 5/2011 | Sugiyama | F21S 10/007 362/84 |
| 2012/0019785 A1* | 1/2012 | Tseng | G03B 21/2013 353/31 |

FOREIGN PATENT DOCUMENTS

| | | |
|---|---|---|
| JP | 2001-092003 | 4/2001 |
| JP | 2001-337390 | 12/2001 |
| JP | 2009-277516 | 11/2009 |
| JP | 2010164645 | 7/2010 |
| JP | 2011-065771 | 3/2011 |

OTHER PUBLICATIONS

IPRP in the parent PCT application No. PCT/CN2013/070136, dated Aug. 26, 2014.
Chinese Office Action, dated Aug. 14, 2013, in a counterpart Chinese patent application, No. CN 201210044533.0.
Japanese Office Action, dated Oct. 4, 2016 in a counterpart Japanese patent application, No. JP 2014-557980.

* cited by examiner

LIGHT EMITTING DEVICE, LIGHT EMITTING DEVICE ASSEMBLY AND RELEVANT PROJECTION SYSTEM

BACKGROUND OF THE INVENTION

Field of the Invention

This invention relates to lighting and display fields, and in particular, it relates to a light emitting device, light emitting device assembly and related projection system.

Description of the Related Art

Conventional phosphor wheels include transmission type and reflection type color wheels. The reflective type phosphor wheel is formed by attaching phosphor materials on a reflective substrate; the excitation light illuminated on the phosphor material is converted into a converted light, which is reflected by the reflective substrate. Thus, the direction of the output converted light of the phosphor wheel is the opposite of the direction of the excitation light illuminating onto the phosphor wheel. In other words, the output side and the input side are the same side of the phosphor wheel. The transmission type phosphor wheel is formed by attaching phosphor materials on a transparent substrate; the excitation light illuminated on the phosphor material is converted into a converted light, which transmits through the transparent substrate. Typically, a filter that transmits the excitation light and reflects the converted light is provided on the input side of the phosphor wheel. Thus, the direction of the output converted light of the phosphor wheel is the same as the direction of the excitation light illuminating onto the phosphor wheel. In other words, the output side and the input side are two different sides of the phosphor wheel.

Referring to FIGS. 1a and 1b; FIG. 1a is a side view of a conventional phosphor wheel, and FIG. 1b is top plan view of the wavelength conversion device of the phosphor wheel of FIG. 1a. As shown in FIGS. 1a and 1b, the phosphor wheel includes a wavelength conversion device 10 containing phosphor materials and a motor 20. The wavelength conversion device 10 includes a substrate 11 and a wavelength conversion layer 12 stacked together, and the substrate is directly in contact with the motor 20. The surface of the motor 20 that directly contacts the substrate is the drive surface of the motor. The substrate has a circular plate shape, and the motor 20 has a cylindrical shape coaxial with the circular plate, for driving the wavelength conversion device 10 to rotate around the center of the circular plate. The wavelength conversion layer 12 has a ring shape coaxial with the substrate; at least one type of phosphor material is provided on the ring shape for receiving the excitation light A and converting it to converted light B.

By studying the conventional phosphor wheels, the inventors of this invention discovered that, if the phosphor wheel is the transmission type, to allow the excitation light to pass through the wavelength conversion layer without being blocked by the motor, the inner radius of the wavelength conversion layer 12 needs to be larger than the radius of the drive surface of the motor, so that the area of the wavelength conversion device is larger than the sum of the area of the motor's drive surface and the area of the wavelength conversion layer 12. Similarly, when a reflective type phosphor wheel is used, and the excitation light illuminates on the wavelength conversion device from a side of the wavelength conversion device facing the motor, then the area of the wavelength conversion device 10 needs to be larger than the sum of the area of the motor's drive surface and the area of the wavelength conversion layer 12. It can be seen that the area of the wavelength conversion device 10 needs to be larger than the sum of the area of the motor's drive surface and the area of the wavelength conversion layer 12, so it is difficult to use such phosphor wheels in products that require a relatively small thickness.

SUMMARY OF THE INVENTION

The main technical problem solved by this invention is to provide a light emitting device, light emitting device assembly, and related projection system, where the light emitting device assembly is a phosphor wheel, and the area of wavelength conversion device of the phosphor wheel is smaller than the above-mentioned sum.

An embodiment of the present invention provides a light emitting device, including:

an excitation light source for emitting an excitation light;

a wavelength conversion device, including a wavelength conversion layer having at least one wavelength conversion section, the wavelength conversion section receiving the excitation light and converting it into a converted light;

a drive device having a drive surface, for driving the wavelength conversion device to move, so that a light spot of the excitation light formed on the wavelength conversion device acts on the wavelength conversion device along a predetermined path;

an adapter, for coaxially connecting the drive device and the wavelength conversion device, and enabling a light ray to illuminate the wavelength conversion device from a side facing the drive device and inside an axial-direction projection of the drive surface on the wavelength conversion device;

wherein respective axial-direction projections of the drive surface and the wavelength conversion layer at least partially overlap, and wherein the excitation light illuminates the wavelength conversion layer inside an axial-direction projection of the drive surface on the wavelength conversion device.

Another embodiment of the present invention provides a light emitting device assembly, including:

a wavelength conversion device, including a wavelength conversion layer having at least one wavelength conversion section, the wavelength conversion section receiving an excitation light and converting it into a converted light;

a drive device having a drive surface, for driving the wavelength conversion device to move, so that a light spot of the excitation light formed on the wavelength conversion device acts on the wavelength conversion device along a predetermined path;

an adapter, for coaxially connecting the drive device and the wavelength conversion device, and enabling a light ray to illuminate the wavelength conversion device from a side facing the drive device and inside an axial-direction projection of the drive surface on the wavelength conversion device;

wherein respective axial-direction projections of the drive surface and the wavelength conversion layer at least partially overlap.

Another embodiment of the present invention provides a projection system including the above light emitting device.

Compared to conventional technology, the present invention has the following advantages:

In the light emitting device according to embodiments of the present invention, by using the adapter, the excitation light can illuminate the wavelength conversion device inside an axial-direction projection of the drive surface on the wavelength conversion device without being blocked by the drive device; further, by making the respective axial-direction projections of the drive surface of the drive device and the wavelength conversion layer at least partially overlap, when the area of the wavelength conversion device can be smaller than the sum of the area of the drive surface and the area of the wavelength conversion layer, the excitation light can still illuminate the wavelength conversion layer inside an axial-direction projection of the drive surface on the wavelength conversion device without being blocked by the drive device. Compared with conventional technologies, the wavelength conversion device in the light emitting device assembly according to embodiments of the present invention has the advantage of a smaller surface area, so that the light emitting device assembly can be used in products that require a relatively small thickness.

BRIEF DESCRIPTION OF THE DRAWINGS

FIG. 1b is a top plan view of the wavelength conversion device of the phosphor wheel of FIG. 1a;

FIG. 2b is a side view of the wavelength conversion device of the embodiment of FIG. 2a;

DETAILED DESCRIPTION OF THE PREFERRED EMBODIMENTS

Embodiments of the present invention are described in detail below with reference to the drawings.

First Embodiment

Figure 1A:
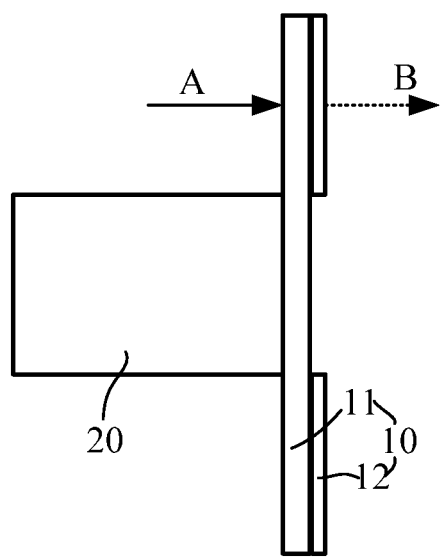
FIG. 1a is a side vide of a phosphor wheel according to conventional technologies.
Figure 1B:
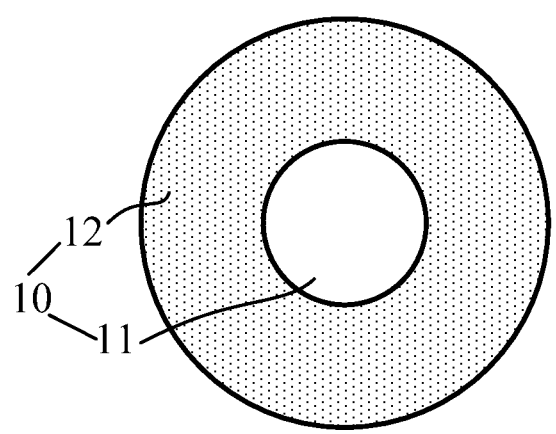
Figure 2A:
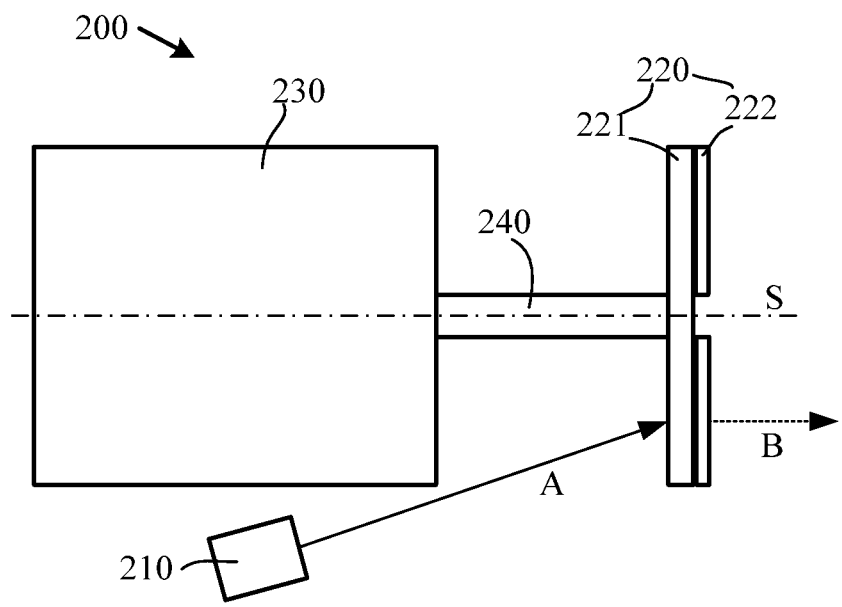
FIG. 2a illustrates the structure of a light emitting device according to an embodiment of the present invention.
Figure 2B:
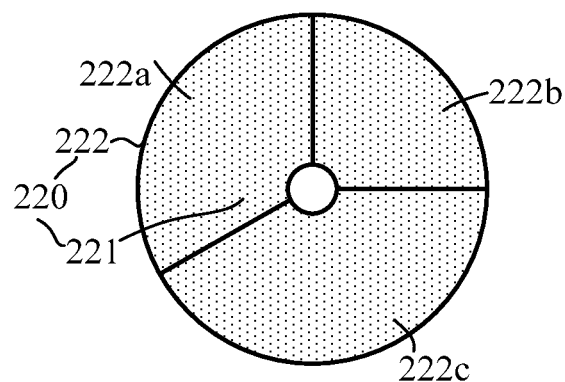

Referring to FIGS. 2a and 2b; FIG. 2a illustrates the structure of a light emitting device according to an embodiment of the present invention, and FIG. 2b is a side view of the wavelength conversion device of the embodiment of FIG. 2a. As shown in FIG. 2a, the light emitting device 200 includes an excitation light source 210, a wavelength conversion device 220, a drive device 230 and an adapter 240.

The excitation light source 210 is used to generate an excitation light. The excitation light source 210 is preferably a laser diode, light emitting diode or other solid state light source. In this embodiment, the excitation light source 210 is a laser diode generating a blue light.

The wavelength conversion device 220 includes a substrate 221 and a wavelength conversion layer 222 stacked together. The substrate and the wavelength conversion layer can be affixed together in a number of ways, including bonding with an adhesive. As shown in FIG. 2b, the substrate 221 has a circular plate shape, and the wavelength conversion layer 222 has a ring shape coaxial with the substrate; the outer diameter of the ring is preferably equal to the diameter of the substrate.

The wavelength conversion layer 222 includes at least one wavelength conversion section, the wavelength conversion section receiving the excitation light and converting it into a converted light. Specifically, the wavelength conversion layer 222 includes a first subsection 222a, a second subsection 222b and a third subsection 222c, which are arranged in a peripheral direction of the substrate. The first, second and third subsections respectively carry a red wavelength conversion material for converting the blue light to a red light, a green wavelength conversion material for converting the blue light to a green light, and a scattering material that transmits the blue light and eliminates its coherence. A common wavelength conversion material is phosphor, such as YAG phosphor which can absorb blue light and emits a yellow converted light. The wavelength conversion material may also be quantum dots, fluorescent dye and other materials that have wavelength conversion functions, not limited to phosphors.

It can be easily understood that in other embodiments, the wavelength conversion layer may have only one subsection, or have other numbers of subsections; the various subsections of the wavelength conversion layer can have a radial distribution, or other spatial distribution. The various subsections of the wavelength conversion layer can all carry wavelength conversion materials. Regarding the wavelength conversion device, it should be noted that the substrate 221 is used to carry the wavelength conversion layer; when the wavelength conversion layer itself is sufficiently rigid (for example, when the wavelength conversion layer is formed by mixing phosphor powder in a transparent glass material), the substrate 221 can be omitted.

The drive device 230 is specifically a motor having a cylindrical shape. The adapter 240 is used to coaxially connect the drive device 230 and the wavelength conversion device 220. The common axis of these three components is denoted S. The drive device includes a drive surface, which refers to the surface where the drive device is connected to the adapter. The drive device drives the wavelength conversion device, via the adapter, to rotate around the center O (not shown) of the substrate, so that the light spot of the excitation light formed on the wavelength conversion device acts on the wavelength conversion device along a circular path. Thus, the three subsections of the wavelength conversion layer 222 sequentially enter the illumination region of the excitation light, so that the wavelength conversion layer 222 emits a color light sequence of red, green and blue lights sequentially.

In this embodiment, the adapter 240 includes a rod shaped connecting section; the two ends of the connecting section are respectively affixed coaxially to the drive device 230 and the substrate 221 of the wavelength conversion device 220. Here, a variety of methods can be used to affix them, such as bonding with an adhesive, soldering, etc. The end surface of the connecting section is smaller than the drive surface of the drive device. Preferably, the ratio of the area of the end surface of the connecting section to the drive surface of the drive device is greater than ¼ and less than ½. Because the end surface of the connecting section is smaller than the drive surface of the motor, there is a space between the drive device 230 and the wavelength conversion device 220 where light can pass. Thus, light can illuminate the wavelength conversion device 220 from the side facing the drive device and inside an axial-direction projection of the drive surface on the wavelength conversion device. For example, if the drive surface of the drive device has a radius of 1 cm, then the adapter allows the light to illuminate the wavelength conversion device 220 from the side facing the drive device inside a round area of 1 cm radius centered on the point O.

In this embodiment, by using the adapter, the excitation light A can illuminate the wavelength conversion device inside an axial-direction projection of the drive surface on the wavelength conversion device without being blocked by the drive device. Further, by making the respective axial-direction projections of the drive surface of the drive device 230 and the wavelength conversion layer 222 at least partially overlap, the area of the wavelength conversion device can be smaller than the sum of the area of the drive surface and the area of the wavelength conversion layer, and the excitation light A can still illuminate the wavelength conversion layer inside an axial-direction projection of the drive surface on the wavelength conversion device without being blocked by the drive device. Compared with conventional technologies, the wavelength conversion device of this embodiment has the advantage of a smaller surface area.

Preferably, the area of the wavelength conversion device 220 is equal to the area of the drive surface of the drive device; in such a case, the projection of the drive surface of the drive device 230 along the S axis completely covers the projection of the wavelength conversion layer 222 along the S axis. This makes product assembly easier and improves the appearance of the product. It should be understood that the area of the wavelength conversion device 220 can also be smaller than or larger than the area of the drive surface of the drive device.

In this embodiment, the blue light A from the excitation light source 210 is incident on the substrate 221, at an oblique angle, from the side of the wavelength conversion device facing the drive device and inside an axial-direction projection of the drive surface on the wavelength conversion device. The excitation light then enters the wavelength conversion layer 222 from the substrate 221. The wavelength conversion layer 222 receives the blue light, and emits a color light sequence B of red, green and blue lights sequentially. The light output direction of the wavelength conversion layer is the same as the light input direction, i.e., the wavelength conversion device 220 is a transmission type. Preferably, the substrate 221 has an optical property that transmits the excitation light and reflects the converted light, to enhance the light output ratio of the wavelength conversion device 220. It can be understood that, when the wavelength conversion device is a transmission type, the blue light A from the excitation light source 210 can also be incident on the wavelength conversion device from a side that faces away from the drive device and inside an axial-direction projection of the drive surface on the wavelength conversion device; the color light sequence B can be output from a surface of the wavelength conversion device that face the drive device. Of course, the wavelength conversion device can be a reflective type, which will be explained in the following embodiment and not described in detail here.

In addition, the light emitting device can also includes a light collecting device (not shown in the drawings), for collecting the output light form the wavelength conversion layer. This feature can also be used in the other embodiments described below. The light collecting device may be an optical device that has light smoothing or shaping functions, such as a light smoothing rod.

Second Embodiment

Figure 3:
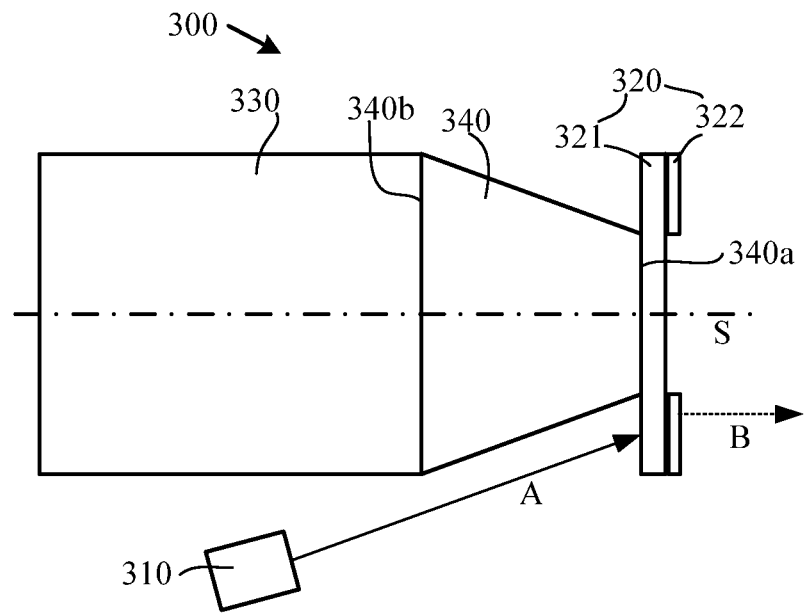
FIG. 3 illustrates the structure of a light emitting device according to another embodiment of the present invention.

Referring to FIG. 3, which illustrates the structure of a light emitting device according to another embodiment of the present invention. As shown in FIG. 3, the light emitting device 300 includes an excitation light source 310, a wavelength conversion device 320, a drive device 330, and an adapter 340. The wavelength conversion device 320 includes a substrate 321 and a wavelength conversion layer 322 stacked together.

A difference between this embodiment and the embodiment of FIG. 2a is that, the adapter 340 has the shape of a truncated cone, with its upper end 340a affixed to the wavelength conversion device 320, and its lower end 340b affixed to the drive device 330. The upper end 340a is smaller than the drive surface of the drive device, so that light can illuminate the wavelength conversion device 320 on the surface facing the drive device and inside an axial-direction projection of the drive surface on the wavelength conversion device.

Preferably, the lower end 340b of the adapter completely overlaps the drive surface of the drive device, to achieve a more secure connection between the adapter and the drive device. Preferably, the blue light from the excitation light source 310 is incident on the wavelength conversion device 320, at an oblique angle, from the side of the wavelength conversion device facing the drive device and inside an axial-direction projection of the drive surface on the wavelength conversion device. The angle between the excitation light A and drive surface is equal to the angle between the generator of the side surface of the adapter 340 and that surface. This can ensure that while the wavelength conversion device is as small as possible, the incident angle of the excitation light onto the wavelength conversion device is minimized.

Compared with the embodiment shown in FIG. 2a, because the adapter is a truncated cone, the wavelength conversion device has a better motion balance. It can be easily understood that, in another embodiment, the upper and lower ends of the truncated-cone shaped adapter can respectively be affixed to the drive device and the wavelength conversion device.

It should be noted that in another preferred embodiment, the adapter 340 can be replaced by a truncated regular pyramid. Similarly, preferably, the upper and lower ends of the truncated-pyramid shaped adapter are respectively affixed to the wavelength conversion device and the drive device. Preferably, the blue light from the excitation light source 310 is incident on the substrate 221, at an oblique angle, from the side of the wavelength conversion device facing the drive device and inside an axial-direction projection of the drive surface on the wavelength conversion device, and the angle between the excitation light A and drive surface is equal to the angle between the side edge of the adapter 340 and that surface.

Third Embodiment

Figure 4:
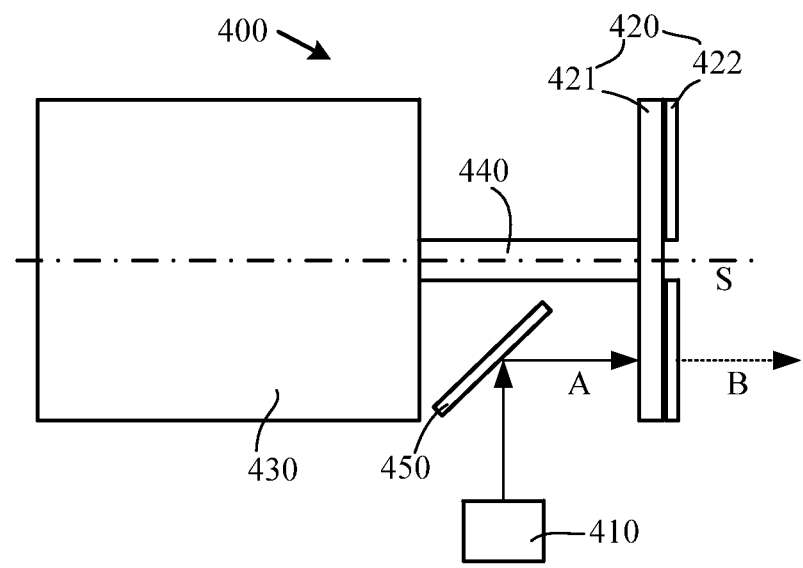
FIG. 4 illustrates the structure of a light emitting device according to another embodiment of the present invention.

Referring to FIG. 4, which illustrates the structure of a light emitting device according to another embodiment of the present invention. As shown in FIG. 4, the light emitting device 400 includes an excitation light source 410, a wavelength conversion device 420, a drive device 430, and an adapter 440. The wavelength conversion device 420 includes a substrate 421 and a wavelength conversion layer 422 stacked together.

A difference between this embodiment and the embodiment of FIG. 2a is that, the light emitting device 400 additionally includes a reflector 450, for reflecting the excitation light from the excitation light source 410, so that the excitation light is incident on the wavelength conversion layer 422 at a normal angle from the side of the wavelength conversion device 420 facing the drive device. Clearly, the reflector should be disposed in a space surrounded by the drive device, the adapter and the wavelength conversion device. The reflector 450 may be a reflecting mirror, prism, a filter that reflects the excitation light and transmits other light, etc. Any optical device that can change the optical path of the excitation light may be used, and they are not discussed in detail here.

Compared to the embodiment of FIG. 2a, in this embodiment, by changing the optical path of the input light generated by the excitation light source 410 using the reflector, the excitation light source 410 can be located as close as possible to the area of the drive surface of the drive device, and can even be located inside an axial-direction projection of the drive surface of the drive device on the wavelength conversion device, so that the light emitting device 400 can have a more compact structure.

Fourth Embodiment

Figure 5:
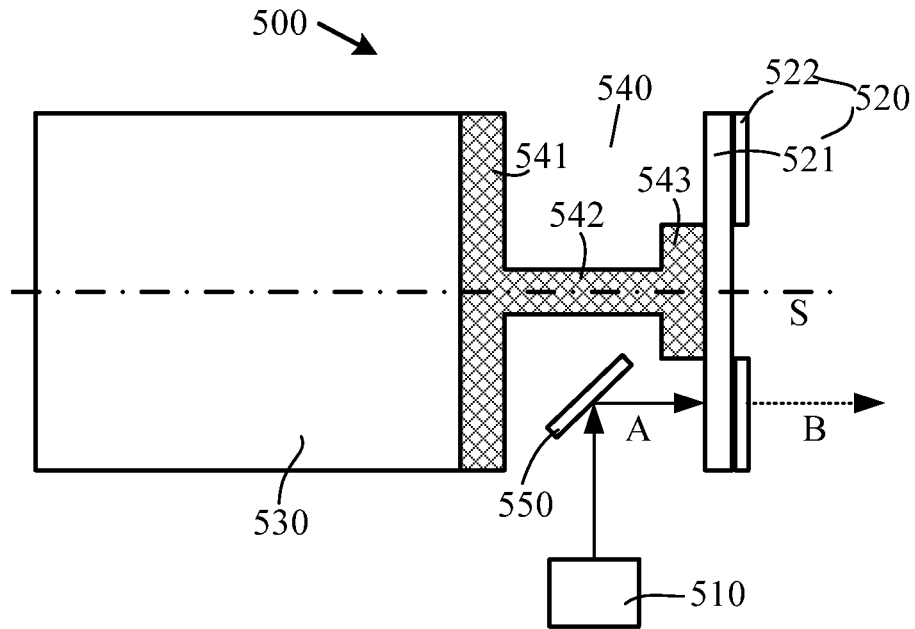
FIG. 5 illustrates the structure of a light emitting device according to another embodiment of the present invention.

Referring to FIG. 5, which illustrates the structure of a light emitting device according to another embodiment of the present invention. As shown in FIG. 5, the light emitting device 500 includes an excitation light source 510, a wavelength conversion device 520, a drive device 530, and an adapter 540. The wavelength conversion device 520 includes a substrate 521 and a wavelength conversion layer 522 stacked together.

A difference between this embodiment and the embodiment of FIG. 4 is that, the adapter 540 of this embodiment includes an adapting section 541, a connecting section 542 and a supporting section 543. Specifically, the adapting section 541, the connecting section 542 and the supporting section 543 are all cylindrical shaped. The two ends of the adapting section 541 are respectively affixed to the drive device and the connecting section 542, and the two ends of the supporting section 543 are respectively affixed to the connecting section 542 and the substrate 521. The end surface of the connecting section 542 is smaller than the end surface of the adapting section 541, and also smaller than the end surface of the supporting section 543, so that the wavelength conversion device has good motion balance. Preferably, the end surface of the adapting section completely overlaps with the drive surface of the drive device, and the end surface of the supporting section is smaller than the end surface of the adapting section; in other words, the adapter 540 has an H shape, which further improves the motion balance of the wavelength conversion device. In addition, preferably, the adapter including the adapting section 541, the connecting section 542 and the supporting section 543 is formed integrally as one piece.

It is easy to understand that the adapting section and the supporting section can also have other shapes, such as a truncated cone or a truncated regular pyramid, so long as the end surfaces of the connecting section are smaller than the various cross-sections of the adapting section and the supporting section. Further, the adapter including the adapting section 541, the connecting section 542 and the supporting section 543 can be formed by three separate pieces fixedly connected to each other. It should be noted that, either the adapting section or the supporting section can be additionally employed relative to the embodiment of FIG. 4, which is sufficient to improve the motion balance of the wavelength conversion device; it is not required that both the adapting section or the supporting section be used.

Fifth Embodiment

Figure 6:
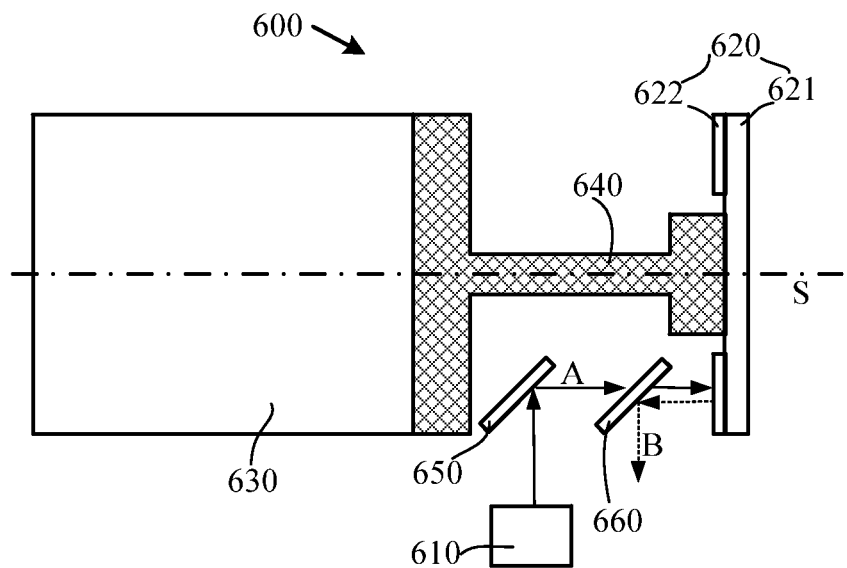
FIG. 6 illustrates the structure of a light emitting device according to another embodiment of the present invention.

Referring to FIG. 6, which illustrates the structure of a light emitting device according to another embodiment of the present invention. As shown in FIG. 6, the light emitting device 600 includes an excitation light source 610, a wavelength conversion device 620, a drive device 630, an adapter 640, and a reflector 650. The wavelength conversion device 620 includes a substrate 621 and a wavelength conversion layer 622 stacked together.

Differences between this embodiment and the embodiment of FIG. 5 include:

(1) The excitation light emitted by the excitation light source 610 is an ultraviolet (UV) light.

(2) The wavelength conversion device 620 is a reflective type device; specifically, the wavelength conversion layer 622 is disposed on the surface of the substrate 621 that faces the drive device, and the substrate 621 is a reflector. Moreover, the first, second and third subsections of the wavelength conversion layer 622 respectively carry a red wavelength conversion material for converting the UV light to a red light, a green wavelength conversion material for converting the UV light to a green light, and a blue wavelength conversion material for converting the UV light to a blue light. It can be seen that the wavelength conversion device 620, under excitation of the UV light, will emit red, green and blue light as well as remaining unabsorbed UV light.

(3) The light emitting device 600 further includes a light separation device 660, for guiding the excitation light A reflected by the reflector to be incident on the wavelength conversion layer, and for guiding the converted light emitted from the wavelength conversion layer 622 to be separated from the optical path of the incident excitation light onto the wavelength conversion layer, thereby forming the output light of the light emitting device. Specifically, the light separation device 660 may be a filter that transmits UV light and reflect red, green and blue lights.

It should be noted that, if the wavelength conversion layer 622 has sufficient rigidity, and has a thickness such that the converted light generated by the wavelength conversion layer cannot penetrate it to exit in the direction of the incident excitation light, then the substrate 621 can be omitted.

In the embodiment of FIG. 5, the excitation light source is arranged in a direction perpendicular to the S axis, and the light collecting device that collects the output light should be arranged in a direction parallel to the S axis; as such, the size of the light emitting device is increased in both dimensions. In the present embodiment, on the other hand, because the wavelength conversion device 620 is a reflective type, the excitation light source and the light collecting device that collects the output light can both be arranged in the direction perpendicular to the S axis, so that the size of the light emitting device is increased only in one dimension. As a result, the light emitting device 600 can have a more compact structure.

Sixth Embodiment

Figure 7:
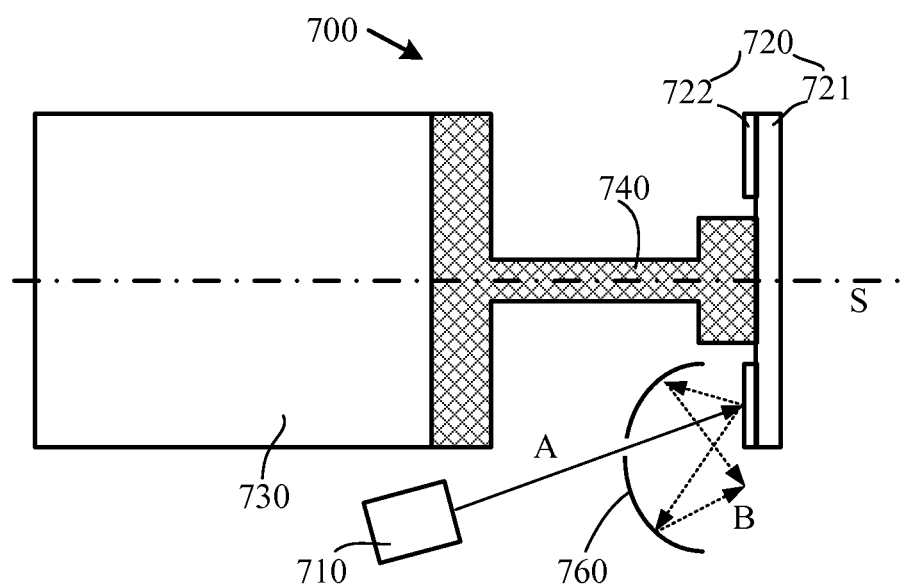
FIG. 7 illustrates the structure of a light emitting device according to another embodiment of the present invention.

Referring to FIG. 7, which illustrates the structure of a light emitting device according to another embodiment of the present invention. As shown in FIG. 7, the light emitting device 700 includes an excitation light source 710, a wavelength conversion device 720, a drive device 730, an adapter 740, a reflector 750, and a light separation device 760. The wavelength conversion device 720 includes a substrate 721 and a wavelength conversion layer 722 stacked together.

Differences between this embodiment and the embodiment of FIG. 6 include:

(1) The excitation light emitted by the excitation light source is a blue light.

(2) The first, second and third subsections of the wavelength conversion layer 722 respectively carry a red wavelength conversion material for converting the blue light to a red light, a green wavelength conversion material for converting the blue light to a green light, and a scattering material.

(3) The light separation device 760 is an arc shaped reflector having a light transmitting aperture and a reflecting surface around the aperture. The blue light A is incident onto the wavelength conversion layer through the aperture. A majority of the light emitted by the wavelength conversion layer is reflected by the reflecting surface of the arc shaped reflector and becomes the output light of the light emitting device 700; a minority of the light escapes through the aperture. Preferably, the arc shaped reflector 760 has the shape of an ellipsoid or a part thereof, and the wavelength conversion layer is located at one focal point of the ellipsoid, so that the majority of the output light of the wavelength conversion layer is reflected by the reflecting surface of the arc shaped reflector to the other focal point. Or, the arc shaped reflector 760 has the shape of a hemisphere or a part thereof, and the wavelength conversion layer is located at a point near the spherical center, so that the majority of the output light of the wavelength conversion layer is reflected by the reflecting surface of the arc shaped reflector to a point that is symmetrical to the first point with respect to the spherical center, where it is collected. The light separation device can have other forms, such as a paraboloid reflecting surface with an aperture, etc. and they are not described in detail here.

The various embodiments above use illustrative examples where the wavelength conversion device is a circular plate and the drive device drives the wavelength conversion devices to rotate. In fact, the wavelength conversion device can be a strip shaped moving plate, and the drive device can drive the strip shaped plate to move lineally back and forth. The wavelength conversion device can also be a cylinder, and the drive device can drive the cylinder to rotate. These are known technologies and are not describe in detail here.

The various embodiments in this disclosure are described progressively where embodiments are described by way of their differences from other embodiments; the common features of the embodiments can be understood by referring to one another.

Other embodiments of the present invention provide a projection system, including a light emitting device, which can have the structure and functions as described in the above embodiments. The projection system can employ various projection technologies, such as liquid crystal display (LCD) projection technology, digital light processor (DLP) projection technology, etc. Further, the above light emitting devices can also be used in lighting systems, such as stage lights.

Further, the present invention provides a light emitting device assembly, which generally includes, based on the description of the above embodiments:

a wavelength conversion device, including a wavelength conversion layer having at least one wavelength conversion section, the wavelength conversion section receiving the excitation light and converting it into a converted light;

a drive device having a drive surface, for driving the wavelength conversion device to move, so that a light spot of the excitation light formed on the wavelength conversion device acts on the wavelength conversion device along a predetermined path;

an adapter, for coaxially connecting the drive device and the wavelength conversion device, and enabling a light ray to illuminate the wavelength conversion device from a side facing the drive device and inside an axial-direction projection of the drive surface on the wavelength conversion device;

wherein respective axial-direction projections of the drive surface and the wavelength conversion layer at least partially overlap.

In the light emitting device assembly according to embodiments of the present invention, by using the adapter, the excitation light can illuminate the wavelength conversion device inside an axial-direction projection of the drive surface on the wavelength conversion device without being blocked by the drive device; further, by making the respective axial-direction projections of the drive surface of the drive device and the wavelength conversion layer at least partially overlap, the area of the wavelength conversion device can be smaller than the sum of the area of the drive surface and the area of the wavelength conversion layer, and the excitation light can still illuminate the wavelength conversion layer inside an axial-direction projection of the drive surface on the wavelength conversion device without being blocked by the drive device. Compared with conventional technologies, the wavelength conversion device in these embodiments has the advantage of a smaller surface area.

The above described embodiments of the present invention are exemplary only and do not limit the scope of the invention. Any equivalent structures and equivalent processes and variations based on the instant disclosure and drawings, or direct or indirect applications in other relevant technology areas, are all within the scope of patent protection of this invention.

What is claimed is:

1. A light emitting device, comprising:
   an excitation light source for emitting an excitation light;
   a wavelength conversion device, including a wavelength conversion layer having at least one wavelength conversion section, the wavelength conversion section receiving the excitation light and converting it into a converted light;
   a drive device having a drive surface, for driving the wavelength conversion device to move, wherein a light spot of the excitation light formed on the wavelength conversion device acts on the wavelength conversion device along a predetermined path;
   an adapter, for coaxially connecting the drive device and the wavelength conversion device, and enabling a light ray to illuminate the wavelength conversion device from a side facing the drive device and inside an axial-direction projection of the drive surface on the wavelength conversion device without striking the drive device;
   wherein respective axial-direction projections of the drive surface and the wavelength conversion layer at least partially overlap, and wherein the excitation light illuminates the wavelength conversion layer inside the axial-direction projection of the drive surface on the wavelength conversion device.

2. The light emitting device of claim 1, wherein the wavelength conversion device has a circular plate shape, and wherein the drive device drives the wavelength conversion device, via the adaptor, to rotate around a center of the circular plate.

3. The light emitting device of claim 1, wherein the adapter includes a connecting section, which has a cylindrical shape with an end surface smaller than the drive surface.

4. The light emitting device of claim 3, wherein the adapter further includes an adapting section, which has two ends respectively affixed to the drive device and the connecting section, and wherein the end surface of the connecting section is smaller than any cross-section of the adapting section.

5. The light emitting device of claim 3, wherein the adapter further includes a supporting section, which has two ends respectively affixed to the wavelength conversion device and the connecting section, and wherein the end surface of the connection section is smaller than any cross-section of the supporting section.

6. The light emitting device of claim 1, wherein the adapter has a shape of a truncated regular pyramid or a truncated cone, wherein upper and lower end surfaces of the adapter are respectively affixed to the wavelength conversion device and the drive device, and wherein the upper end surface is smaller than the drive surface.

7. The light emitting device of claim 1, wherein the excitation light is incident on the wavelength conversion device at an oblique angle from a side of the wavelength conversion device facing the drive device.

8. The light emitting device of claim 7, wherein the adapter has a shape of a truncated regular pyramid or a truncated cone, wherein upper and lower end surfaces of the adapter are respectively affixed to the wavelength conversion device and the drive device, wherein the upper end surface is smaller than the drive surface, and wherein an angle between the excitation light and the upper end surface is equal to an angle between a side surface generator line or a side edge of the adapter and the upper end surface.

9. The light emitting device of claim 7, further comprising a light separation device for guiding the excitation light to be incident on the wavelength conversion layer, and for guiding a part of the light from the wavelength conversion layer to be separated from an optical path of the incident excitation light onto the wavelength conversion layer, to form an output light of the light emitting device.

10. The light emitting device of claim 1, further comprising a reflector for reflecting the excitation light so that the excitation light is incident on the wavelength conversion layer at a normal angle from a side of the wavelength conversion device facing the drive device.

11. The light emitting device of claim 10, further comprising a light separation device for guiding the excitation light reflected by the reflector to be incident on the wavelength conversion layer, and for guiding the converted light emitted from the wavelength conversion layer to be separated from an optical path of the incident excitation light.

12. A projection system, comprising a light emitting device of claim 1.

13. The light emitting device of claim 1, wherein the converted light exits the wavelength conversion device in a direction away from the drive device.

14. The light emitting device of claim 1, wherein the converted light exits the wavelength conversion device in a direction toward the drive device.

15. A light emitting device assembly, comprising:
a wavelength conversion device, including a wavelength conversion layer having at least one wavelength conversion section, the wavelength conversion section receiving an excitation light and converting it into a converted light;
a drive device, including a drive surface, for driving the wavelength conversion device to move, so that a light spot of the excitation light formed on the wavelength conversion device acts on the wavelength conversion device along a predetermined path;
an adapter, for coaxially connecting the drive device and the wavelength conversion device, and enabling a light ray to illuminate the wavelength conversion device from a side facing the drive device and inside an axial-direction projection of the drive surface on the wavelength conversion device without striking the drive device;
wherein respective axial-direction projections of the drive surface and the wavelength conversion layer at least partially overlap.

16. The light emitting device assembly of claim 15, wherein the adapter has a shape of a truncated regular pyramid or a truncated cone, wherein upper and lower end surfaces of the adapter are respectively affixed to the drive device and the wavelength conversion device, and wherein the lower end surface is smaller than the drive surface.

* * * * *